US 7,245,044 B2

(12) United States Patent
Woltereck et al.

(10) Patent No.: US 7,245,044 B2
(45) Date of Patent: Jul. 17, 2007

(54) ELECTRICAL SYSTEM, AND CONTROL MODULE AND SMART POWER SUPPLY FOR ELECTRICAL SYSTEM

(75) Inventors: Martin Woltereck, Petershausen (DE); Joseph G. D'Ambrosio, Clarkston, MI (US); Robert J. Disser, Dayton, OH (US); Michael Graef, Graefeling (DE); Darryl L. Greathouse, Freeland, MI (US); Juergen Guldner, Vaterstetten (DE); Christoph Jung, Karlsfeld (DE); Patrick A. Mescher, Bellbrook, OH (US); Scott A. Millsap, Grand Blanc, MI (US); Hendrikus Smakman, Munich (DE); Jon T. Zumberge, Dayton, OH (US)

(73) Assignees: Delphi Technologies, Inc., Troy, MI (US); Bayerische Motoren Werke Aktiengesellsha (DE)

( * ) Notice: Subject to any disclaimer, the term of this patent is extended or adjusted under 35 U.S.C. 154(b) by 600 days.

(21) Appl. No.: 10/820,625

(22) Filed: Apr. 8, 2004

(65) Prior Publication Data

US 2005/0225173 A1    Oct. 13, 2005

(51) Int. Cl.
*H02J 1/00*    (2006.01)
(52) U.S. Cl. .......................... 307/29; 307/10.1; 307/39
(58) Field of Classification Search ................. 307/29, 307/39, 10.1; 713/340
See application file for complete search history.

(56) References Cited

U.S. PATENT DOCUMENTS

| | | | | |
|---|---|---|---|---|
| 5,225,994 | A  * | 7/1993 | Arinobu et al. | 700/286 |
| 6,070,114 | A  * | 5/2000 | Fendt et al. | 701/45 |
| 6,900,555 | B2 * | 5/2005 | Sakamoto et al. | 307/10.1 |
| 7,007,179 | B2 * | 2/2006 | Mares et al. | 713/310 |

* cited by examiner

*Primary Examiner*—Brian Sircus
*Assistant Examiner*—Andrew Deschere
(74) *Attorney, Agent, or Firm*—Scott A. McBain

(57) ABSTRACT

An electrical system comprised of at least two control modules as well as at least one power supply module. The present invention improves functional reliability of electrical systems by configuring a power supply module as a smart device and connecting it to at least one of the control modules for the purpose of data exchange and, in case of a malfunction, transforming the control module(s) to one of a stand-alone operating mode and a cut-off state.

25 Claims, 2 Drawing Sheets

ELECTRICAL SYSTEM, AND CONTROL MODULE AND SMART POWER SUPPLY FOR ELECTRICAL SYSTEM

FIELD

This invention concerns a vehicle electrical system and, more particularly, a smart power supply module and a control module for a vehicle electrical system.

BACKGROUND

It is well known in the art to protect electrical loads connected to a vehicle electrical system by means of fuses and circuit breakers. In the event of malfunction of a load, such as an electrical short, the load or a group of loads allocated to a particular circuit will be disconnected from the electrical system as the fuse or circuit breaker supplying power to the circuit opens. Power will remain disconnected from the circuit until the fault is removed and the open fuse is replaced or the circuit breaker is reset.

In addition, certain loads are equipped with individual overcurrent protection and/or individual cut-off devices that utilize a self-checking or self-diagnostic routine that either runs continuously, at timed intervals, or is initiated by the occurrence of an internal or external event. If a fault is detected, the load disconnects itself from the vehicle electrical system in accordance with an internal control, such as a microprocessor or a microcontroller, and a set of predetermined instructions such as a computer program.

Alternatively, a fault in a load or a group of loads can also be detected by an external means, such as with a supervisory control module. If a fault is detected, the supervisory control module typically does not directly disconnect the load. Instead, the supervisory control module issues a command to the internal control of the faulty load instructing the control to disconnect the load. The cut-off of the load is then accomplished independently by the internal control for the load or circuit found to be faulty.

There are several disadvantages associated with relying on a load to disconnect itself. For example, if the malfunction in the load affects the load's control, the load may be unable to disconnect. In addition, faults external to the load, such as shorted wiring, often cannot be resolved by disconnecting the load.

Another shortcoming of current means for protecting loads is that they typically do not consider the system-level impact of disconnecting a load. In fact, some loads are critical to the proper operation of a system. For example, a vehicle steer-by-wire system such as the system disclosed by Byers et al. in U.S. Pat. App. No. 2002/0107621 utilizes a plurality of actuators, sensors and controls to transmit steering commands from a hand wheel to the steering system of the vehicle. In addition, a hand wheel actuator configured to receive commands from the hand wheel system is utilized to provide the driver with tactile feedback regarding road conditions. If such a system were to be equipped with individual circuit protection devices, such as fuses and circuit breakers, a momentary electrical overload of a load, such as an actuator, could result in a loss of at least a portion of the vehicle's steering function.

There is a need for a way to protect loads that is not subject to malfunctions in the load and also protects the vehicle wiring. There is a further need for a way to control loads without needlessly crippling or disabling critical components of a system.

SUMMARY

The present invention provides a vehicle electrical system comprising at least one smart power supply module and at least one control module for improved functional reliability. In the discussion that follows, a "smart power supply module" is interpreted to mean a power supply module having an electrical energy supply and an internal control including, without limitation, a processor or programmable logic device, data interchange means such as a data bus transmitter and receiver, and a means for electrically selectively connecting the electrical energy, such that the smart power supply module is capable of selectively supplying electrical energy to loads and exchanging data with loads, all in accordance with a set of predetermined criteria or instructions, such as a computer program. In addition, a "control module" is interpreted herein to mean a control module adapted to transmit and receive data, monitor sensor inputs and control at least one load. Further, the term "load" as used herein is interpreted to mean any type of electrical or electromechanical device including, without limitation, an actuator.

A vehicle electrical system according to an embodiment of the present invention comprises at least one smart power supply module capable of transforming to a safe state a control module detected to be faulty. To this end, the present invention provides that the power supply module be configured such that in the event of an internal malfunction of a control module, the power supply module places the control module into a cut-off state by disconnecting it from the energy supply. In addition, in the event of an interrupted or faulty data exchange at a control module, the power supply module transforms the control module to a stand-alone operational mode. The determination of whether or not a control module is faulty can be made by the control modules directly as well as by the power supply module(s), or jointly by both the control modules and power supply modules.

There are several categories of system faults. A first category relates to an internal malfunction of a control module, wherein the control module fails to function properly due to some internal failure including, without limitation, a failed component, system or hardware item, or a software or firmware problem. A second category of system faults relates to communication problems such as an interrupted or faulty exchange of data at one or more control modules. In such instances the control module itself may be fault-free, but the communication between this control module and other components within an electrical system is faulty. For optimization of functionality and reliability of a vehicle electrical system, it is possible to respond differently to these different categories of faults.

According to an embodiment of the present invention, the power cut-off of a select control module found to be defective based on an internal malfunction is always implemented by an external control, i.e., not directly by the select control module, but by a power supply module or by another control module that is fault-free. In alternate embodiments of the present invention, a power cut-off may be implemented only by a power supply module. For the purpose of cutting off power, controllable solid state switches, for example, may be connected in the supply lines to the control modules.

In an embodiment of the present invention, in the event of an interrupted or faulty communication with other control modules a select control module may "transform" to a stand-alone operating mode and drive one or more locally connected actuators solely based on its locally available information, such as information provided by sensors and transducers. In alternate embodiments of the present invention the transformation of a select control module may be accomplished either by an external control, such as by another control module, by a power supply module, or directly by the select control module. In certain embodiments of the present invention, transformation to a stand-alone operating mode is always implemented by the select control module directly, as soon as the select control module detects a communication fault in its data exchange (i.e., either by self-detection or by communication from other devices). Such a communication fault may be based on the data exchange being totally interrupted or noticeably faulty in accordance with predetermined criteria. In certain embodiments of the present invention, the stand-alone operating mode may be used when several, or all, of the control modules are experiencing faulty or lost data communication, such as a total system communication failure. In this event, stand-alone operation of individual control modules is preferred over a total failure of the control modules so that a predetermined form of emergency or minimal operation of the system is maintained.

In an embodiment of the present invention, in the event that only a single select control module, or a single control module of a group of functionally associated control modules is experiencing an interrupted or faulty data exchange (which is especially noticed through the other control modules), the select control module may be transformed to a stand-alone operating mode, or may switch itself into this mode, but preferably it is disconnected from the power supply module. In an especially preferred embodiment of the present invention the smart power supply module is configured as redundant power supply modules. In this manner a select control module detected as faulty will be disconnected from its sources of power supply only if both power supply modules actually disconnect the faulty control module from their respective power supplies.

It is desirable to capture the output data of components in the electrical system, such as communication data and all kinds of process variables of the control modules, sensors and actuators to be monitored, so as to detect malfunctions in the control modules. Captured data is then forwarded via a data communication means, such as a conventional digital data bus within the system, and processed by power supply modules and control modules within the system.

An object of the present invention is a vehicle electrical system, comprising at least one power supply module and at least two control modules wherein the at least one power supply module is connected to each of the at least two control modules for the purpose of supplying electrical energy; wherein the at least two control modules are interconnected for the purpose of data exchange; wherein the at least one power supply module is configured as a smart device and is connected to at least one of the at least two control modules for the purpose of data exchange; and wherein the at least one power supply module is configured to accomplish at least one of: in the event of an internal malfunction of a select control module, the power supply module will place the select control module into a cut-off state by disconnecting the select control module from the electrical energy provided by the power supply; and in the event of an interrupted or faulty data exchange with a select control module, the power supply will transform the select control module to a stand-alone operating mode.

Another object of the present invention is vehicle electrical system, comprising at least two power supply modules and at least two control modules wherein the at least two power supply modules are connected to each of the at least two control modules for the purpose of supplying electrical energy; wherein the at least two control modules are interconnected for the purpose of data exchange; wherein the at least two power supply modules are configured as smart devices and are connected to at least one of the at least two control modules for the purpose of data exchange; and wherein the at least two power supply modules are configured to accomplish at least one of: in the event of an internal malfunction of a select control module, the power supply modules will place the select control module into a cut-off state by disconnecting the select control module from the electrical energy provided by the power supplies, and in the event of a malfunction of the data exchange with one control module, the power supply modules will transform the select control module to a stand-alone operating mode; and wherein the power supply modules and the control modules are configured so that disconnecting the select control module from the electrical energy supply occurs only if at least two of the power supply modules independently disconnect the select control module from the electrical energy supply.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
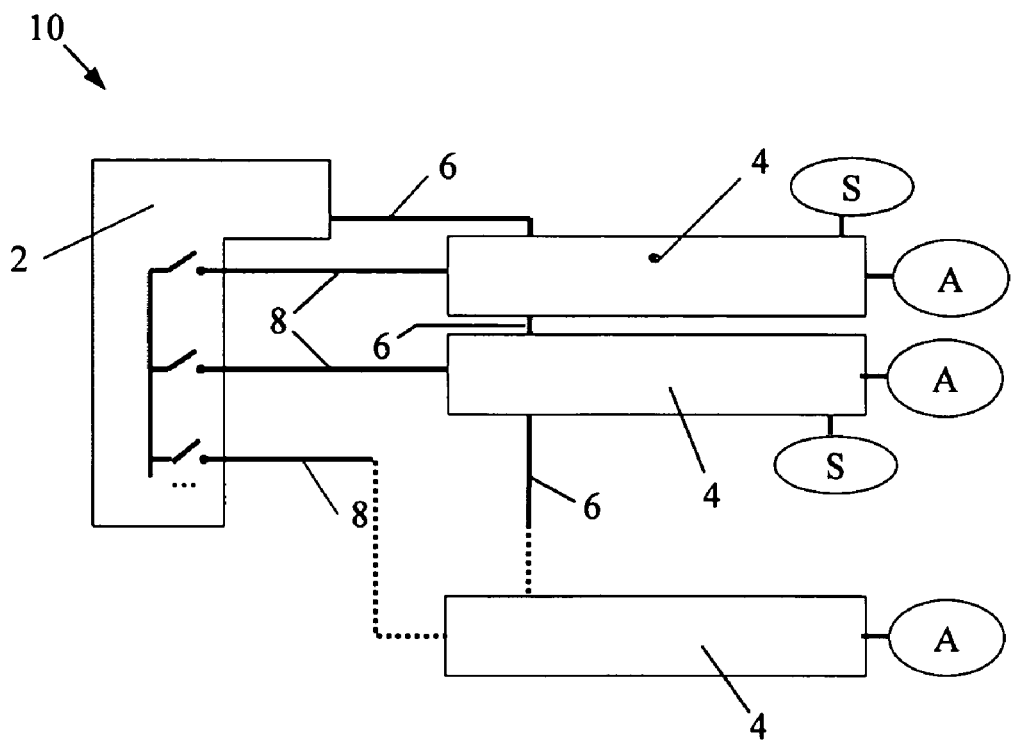
FIG. 1 is a schematic block diagram of a vehicle electrical system according to the present invention, having a smart power supply module and a plurality of control modules connected to the power supply module for power and data.

Corresponding reference characters indicate corresponding components throughout the several views. Although the drawings represent several embodiments of the present invention, the drawings are not necessarily to scale and certain features may be exaggerated or simplified in order to better illustrate and explain the present invention. The exemplification set out herein illustrates an embodiment of the invention in several forms, and such exemplification is not to be construed as limiting the scope of the invention in any manner.

Figure 2:
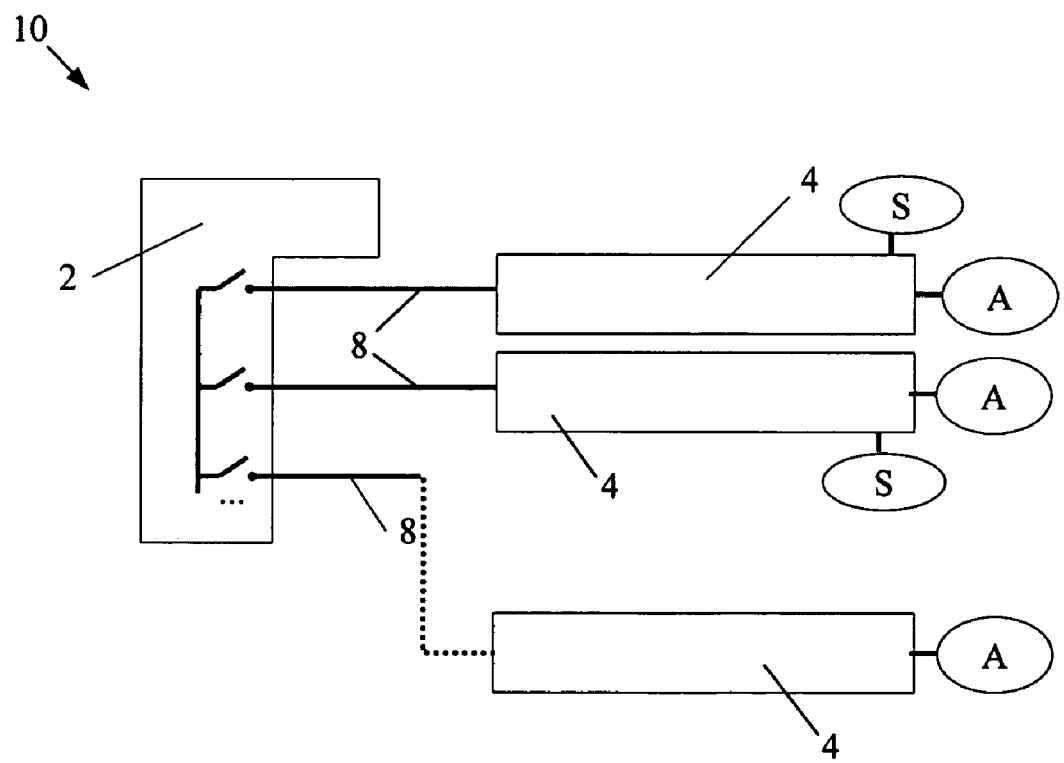
FIG. 2 is schematic block diagram of the vehicle electrical system of FIG. 1 with a data communication failure between the smart power supply module and all control modules, and between all control modules.
Figure 3:
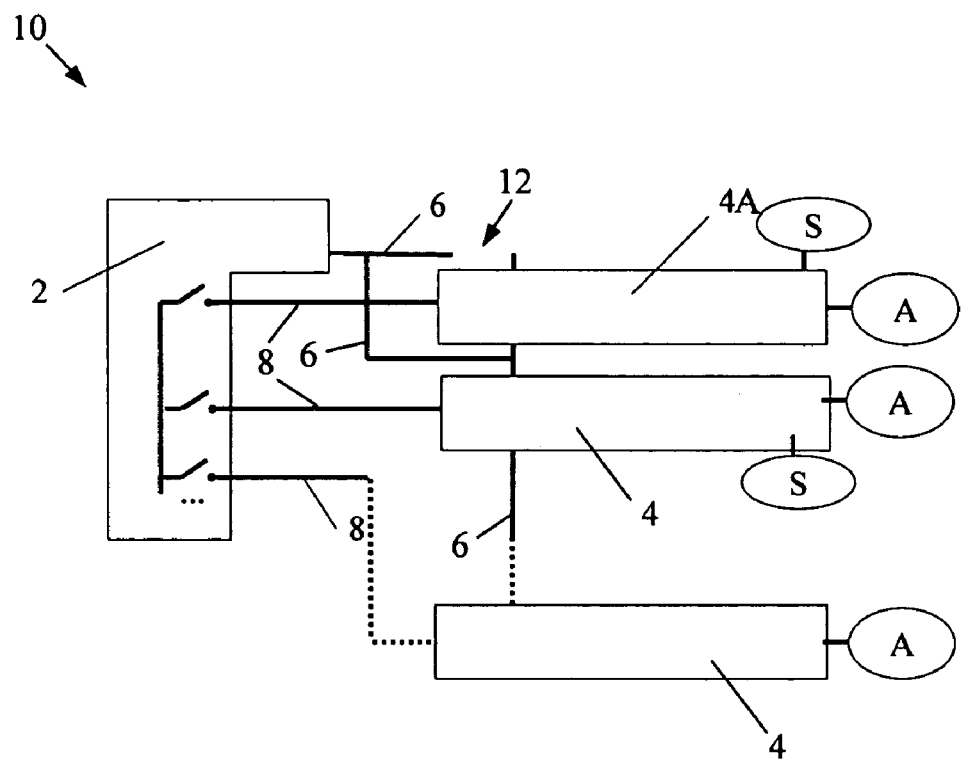
FIG. 3 is a schematic block diagram of the vehicle electrical system of FIG. 1 with a data communication failure for one control module.

FIGS. 1 through 3 are schematic block diagrams of a vehicle electrical system 10 according to an embodiment of the present invention. Vehicle electrical system 10 comprises a smart power supply module 2 (interchangeably termed as "power supply module" herein) and a plurality of control modules 4.

Control modules 4 are interconnected to each other and are also connected to power supply module 2 via a communication network link 6, such as a conventional digital data bus. In an alternate embodiment of the present invention, power supply module 2 and control modules 4 may each be commonly connected to at least one additional communication link 6 (not shown), e.g., for a redundant data transmission means or for a separate transmission of a variety of predetermined data. In this manner, a primary communication link 6 may be used to transmit and receive all process data for the control of process functions. A secondary communication link 6 could be used to exchange data necessary for placing a select control module 4 into a cut-off state or a transformation of a select control module to a stand-alone operating mode. Data communication network 6 is coupled to a smart power supply module 2 as well as control modules 4. In alternate embodiments of the present invention communication link 6 may take the form of a wired, partially wireless, or completely wireless network (e.g., radio, infrared or the like).

For the purpose of supplying electrical energy, each control module 4 is connected to power supply module 2 via a selectively switched power supply link 8, such as through electrical conductors or a supply bus. A control module 4 according to an embodiment of the present invention includes a "smart actuator," such as a brake control, designated as "A" in FIGS. 1-3. A smart actuator typically includes (not shown): a control, such as a processor, a servo amplifier, and a memory device such as a flash memory for storing instructions such as a computer program. A smart actuator which drives hierarchically subordinated actuators that typically are not of smart design, such as electrical or electrohydraulic units for operating the actual brake elements.

For the purpose of selective control of the actuators "A," each control module 4 requires information. This information may consist of simple commands from a superior control module 4, or from power supply module 2. This information may also be available based on data internal to control module 4. To this end, control modules 4 are preferably connected to sensors associated with their control function. Such sensors are designated as "S" in FIGS. 1-3. Aided by intrinsic sensor data, especially in a stand-alone operating mode, a certain basic functionality for particular control modules 4 can be maintained in the event of a fault condition.

Power supply module 2 preferably contains information regarding potential malfunctions of individual control modules 4 such as internal failures and faults of the control, actuators, and sensors, and characteristics of interrupted or faulty communication of select control modules 4 within the data communication network. The information may also include steps to be taken to resolve malfunctions of control modules 4 and interrupted or faulty communication with the control modules.

Detection of a select control module 4 experiencing failures due to internal malfunctions or interrupted or faulty data communication is preferably handled by smart power supply module 2. Alternatively this detection may also be accomplished by any other control device 4 connected to data communication network 6, or by the select control module. Detection by the select control module 4 directly is, however, not always possible when a failure is due to on an internal malfunction. Based on a fault detection as defined above, the select failed control module 4 may be transformed to a safe state either by placing the select control module into a cut-off state by disconnecting the select control module from the energy supply, or by transforming the select control module to a predetermined stand-alone operating mode.

A select failed control module 4 is preferably placed into a cut-off state by being disconnected from an energy supply by power supply module 2. Preferably, a stand-alone operating mode for a select control module 4 is intended only for situations where the select control module is free of internal malfunctions and has been detected as faulty only due to a problem with data exchange, i.e., a communication fault. Transformation into a stand-alone operating mode may be initiated either by a "third" device, such as power supply module 2 or another control module 4 connected to data communication network 6, or directly by the select control module. Preferably, transforming to a stand-alone operating mode is always implemented directly by the select control module 4 affected by a communication fault. In the standalone operating mode a select control module 4 will drive one or more locally-connected actuators solely based on its locally available information, such as information provided by sensors and transducers. The action of select control module 4 in the stand-alone operating mode may be in accordance with predetermined criteria. Further the predetermined criteria may be in the form of a set of instructions, such as a computer program.

Before a select control module 4 detected as faulty is disconnected from an energy supply, a check may be made as to whether the control module is required for the safe operation of electrical system 10, such as control modules adapted for a steer-by-wire vehicle system. If so, then preferably a cut-off is implemented only in the case of concurring cut-off commands from a plurality of monitoring control modules 4 and/or power supply modules 2, or one or several control modules 4 or power supply modules 2 of superior priority in accordance with a predetermined priority scheme.

In another embodiment of the present invention, the stand-alone operating mode of a select control module 4 may be verified by other devices connected to data communication network 6. If a majority of the devices in data communication network 6 elect to disconnect a select control module 4 that is currently in a stand-alone operating mode, or is to be transformed into a stand-alone operating mode, based on predetermined criteria to be checked, then the select control module will be disconnected from the power supply. To accomplish this, a cut-off command request may be transmitted via data communication link 6 to power supply module 2 by at least one control module 4, or a cut-off command may be generated by the power supply module based on test results of the suspected faulty control module in accordance with predetermined criteria. Test criteria includes, without limitation, a check as to whether the tested select control module 4 is merely one single, or one of a group of several functionally associated control modules, to make sure that no significant function of electrical system 10 is placed at risk as a result of disconnecting the select control module.

In the event that several or all control modules 4 are interrupted or faulty in their communication, preferably no cut-off from power supply module 2 is implemented, but instead control modules 4 are switched over to a stand-alone operating mode. In this manner any consequences of a total failure of a system can be minimized as a predetermined, basic functionality is maintained.

In alternate embodiments of the present invention, control modules 4 connected to data communication network 6 are periodically checked to determine whether they are in a "failed" state such as in a cut-off state or a stand-alone operating mode. The checking may be accomplished by power supply module 2 and/or between control modules 4. Upon the detection of a select failed control module 4, electrical system 10 may attempt to restore the select control module to a proper operating state. To attempt to restore the select control module 4, power supply module 2 may individually, temporarily disconnect the select control module from the energy supply of power supply 2 to attempt a power-down-reset of the select control module. Upon power-up of the select control module 4, reintegration into the data communication network may be implemented or at least attempted. In this manner, any control module 4 detected as faulty and therefore originally cut off, as well as any control module 4 which failed due to a software or firmware-related issue and is therefore no longer an active part of data communication network 6, but which otherwise is fault and malfunction free and functional, may be reintegrated into the data communication network. A power-down-reset is preferably initiated only when a majority of monitoring control modules 4 and/or power supply modules 2 have labeled the select affected control module as "failed." The definition of such a majority may be based on such criteria as the number of power supply modules 2 and control modules 4, logical weighting of classes or groups of power supply modules and control modules, and the priority of particular power supply modules and control modules based on such criteria as criticality of function.

FIG. 2 schematically shows a total failure of data communication network 6 in vehicle electrical system 10 such that the network is not present. In this configuration, the control modules 4 may each be transformed to a stand-alone operating mode, collecting data from sensors "S" coupled to the control modules and controlling the operation of actuators "A" in accordance with a predetermined set of criteria, or instructions, such as a computer program.

FIG. 3 shows the communication failure of an individual control module 4 (designated as "4A" in the figure) due to an open circuit 12 in data communication network 6. In this configuration, control module 4A experiencing the communication failure may be transformed to a stand-alone operating mode while the remaining control modules 4, which are still connected to data communication network 6, continue to operate in conjunction with each other and with power supply module 2 in a predetermined manner.

Figure 4:
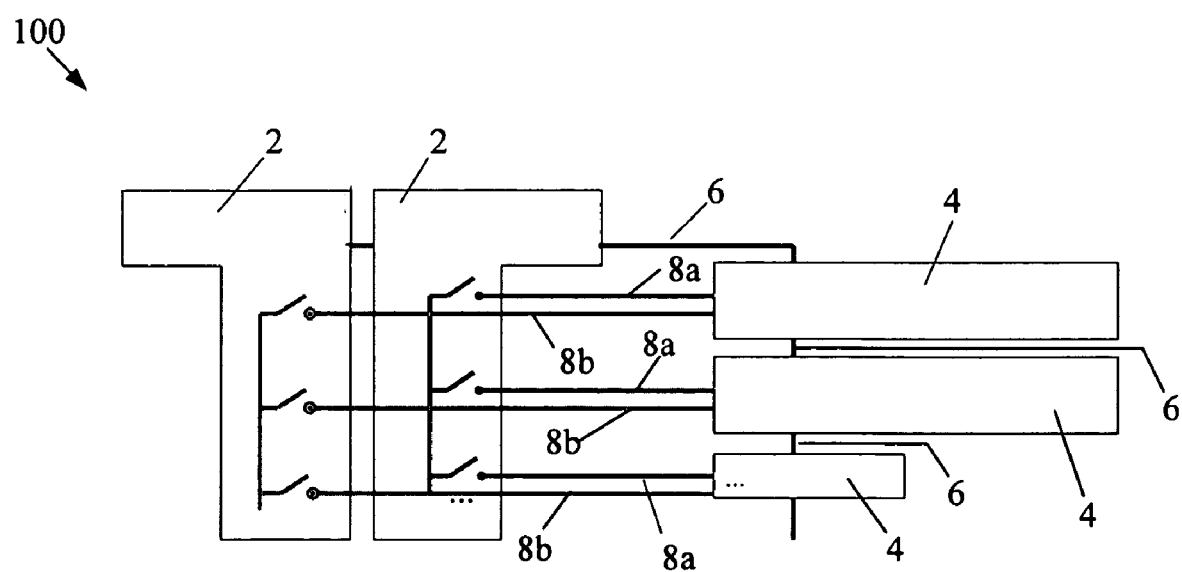
FIG. 4 is a schematic block diagram of a vehicle electrical system with a redundant power supply according to an alternate embodiment of the present invention.

An alternate embodiment of the present invention is shown in FIG. 4 wherein a vehicle electrical system 100 comprises redundant power modules 2 and a plurality of control modules 4. There are preferably at least two smart power supply modules 2 which each supply power to control modules 4 through separate power supply links 8a, 8b. All of the control modules 4 may be coupled to power supply links 8a, 8b or, alternately, only the most system-critical control modules may be supplied with redundant power through links 8a, 8b. This embodiment ensures to a greater extent that any erroneous cut-offs of control modules 4 due to erroneous information in electrical system 10 are prevented. Before a control module 4 is cut off from power, both power supply modules 2 must first independently cut off the suspected faulty control module. Otherwise, at least one power supply 2 will maintain a power connection to the suspected faulty control module 4 such that the suspected faulty control module remains coupled to the system.

The present invention comprises a smart power supply module 2 as well as a control module 4 for a vehicle electrical system, as described above. Power supply module 2 according to an embodiment of the present invention is configured so that every control module 4 connected to the power supply module for power may disconnect itself selectively. Control module 4 according to this embodiment of the present invention is configured so that in the event of a communication fault, it automatically switches over to the a stand-alone operating mode as described above.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known of customary practice in the art to which this invention pertains.

What is claimed is:

1. A vehicle electrical system, comprising:
at least one power supply module; and
at least two control modules;
wherein the at least one power supply module is connected to each of the at least two control modules for the purpose of supplying electrical energy;
wherein the at least two control modules are interconnected for the purpose of data exchange;
wherein the at least one power supply module is configured as a smart device and is connected to at least one of the at least two control modules for the purpose of data exchange; and
wherein the at least one power supply module is configured to accomplish at least one of:
in the event of an internal malfunction of a select control module, the power supply module will place the select control module into a cut-off state by disconnecting the select control module from the electrical energy provided by the power supply; and
in the event of an interrupted or faulty data exchange with a select control module, the power supply will transform the select control module to a stand-alone operating mode.

2. The vehicle electrical system of claim 1 wherein the detection of an interrupted or faulty data exchange with the select control module is provided by at least one of:
at least one other control module; and
the power supply module.

3. The vehicle electrical system of claim 1 wherein the at least one power supply module comprises a plurality of power supply modules configured so that in the event of an interrupted or faulty data exchange with the select control module, at least one of the power supply modules switches the select control module to the stand-alone operating mode.

4. The vehicle electrical system of claim 1 wherein at least one control module is configured so that in the event of an interrupted or faulty data exchange with the select control module, at least one control module transforms the select control module into the stand-alone operating mode.

5. The vehicle electrical system of claim 1 wherein each control module is configured so that in the event of an interrupted or faulty data exchange, each control module transforms itself to the stand-alone operating mode.

6. The vehicle electrical system of claim 1 wherein each control module is configured so that they may be transformed into the cut-off state from the stand-alone operating mode.

7. The vehicle electrical system of claim 6 wherein the transformation of a select control module from the stand-alone operating mode into the cut-off state is implemented based on a majority decision of at least one of:
at least one other control module; and
the power supply module;

wherein the select control module being in the stand-alone operating mode represents a single, faulty control module of an otherwise fault-free, functionally associated group of control modules.

8. The vehicle electrical system of claim 1, comprising at least two power supply modules, wherein the power supply modules and the control modules are configured so that disconnecting the select control module from the electrical energy supply occurs only if at least two of the power supply modules independently disconnect the select control module from the electrical energy supply.

9. The smart power supply module of claim 1 wherein the power supply module is configured to be capable of detecting an interrupted or faulty data exchange with at least one of the connected control modules and, upon detecting the interrupted or faulty data exchange, disconnecting the select control module from the source of electrical energy.

10. The control module of claim 1 wherein the control module is configured so that in the event of an interrupted or faulty data exchange, the control module will transform itself into the stand-alone operating mode.

11. A vehicle electrical system, comprising:
at least one power supply module; and
at least two control modules;
wherein the at least one power supply module is connected to each of the at least two control modules for the purpose of supplying electrical energy;
wherein the at least two control modules are interconnected for the purpose of data exchange;
wherein the at least one power supply module is configured as a smart device and is connected to at least one of the at least two control modules for the purpose of data exchange; and
wherein the at least one power supply module is configured to accomplish at least one of:
in the event of an internal malfunction of a select control module, the power supply module will place the select control module into a cut-off state by disconnecting the select control module from the electrical energy provided by the power supply;
in the event of an interrupted or faulty data exchange with a select control module, the power supply will transform the select control module to a stand-alone operating mode;
wherein the detection of an interrupted or faulty data exchange with the select control module is provided by at least one of: at least one other control module, and the power supply module; and
wherein at least one control module is configured so that in the event of a malfunction in the data exchange with the select control module, at least one control module transforms the select control module into the stand-alone operating mode.

12. The vehicle electrical system of 11 wherein each control module is configured so that in the event of an interrupted or faulty data exchange, each control module transforms itself to the stand-alone operating mode.

13. The vehicle electrical system of 11 wherein each control module is configured so that they may be transformed into the cut-off state from the stand-alone operating mode.

14. The vehicle electrical system of claim 13 wherein the transformation of a select control module from the stand-alone operating mode into the cut-off state is implemented based on a majority decision of at least one of:
at least one other control module; and
the power supply modules;
wherein the select control module being in the stand-alone operating mode represents a single, faulty control module of an otherwise fault-free, functionally associated group of control modules.

15. A vehicle electrical system, comprising:
at least two power supply modules; and
at least two control modules;
wherein the at least two power supply modules are connected to each of the at least two control modules for the purpose of supplying electrical energy;
wherein the at least two control modules are interconnected for the purpose of data exchange;
wherein the at least two power supply modules are configured as smart devices and are connected to at least one of the at least two control modules for the purpose of data exchange; and
wherein the at least two power supply modules are configured to accomplish at least one of:
in the event of an internal malfunction of a select control module, the power supply modules will place the select control module into a cut-off state by disconnecting the select control module from the electrical energy provided by the power supplies, and
in the event of an interrupted or faulty data exchange with a select control module, the power supply modules will transform the select control module to a stand-alone operating mode;
wherein the detection of an interrupted or faulty data exchange with the select control module is provided by at least one of:
at least one other control module; and
the power supply module; and
wherein the power supply modules and the control modules are configured so that disconnecting the select control module from the electrical energy supply occurs only if at least two of the power supply modules independently disconnect the select control module from the electrical energy supply.

16. The vehicle electrical system of claim 15 wherein the at least two power supply modules are configured so that in the event of an interrupted or faulty data exchange with the select control module, at least one of the power supply modules switches the select control module to the stand-alone operating mode.

17. The vehicle electrical system of claim 15 wherein at least one control module is configured so that in the event of an interrupted or faulty data exchange with the select control module, at least one control module transforms the select control module into the stand-alone operating mode.

18. The vehicle electrical system of claim 15 wherein each control module is configured so that in the event of an interrupted or faulty data exchange, each control module transforms itself to the stand-alone operating mode.

19. The vehicle electrical system of claim 15 wherein each control module is configured so that they may be transformed into the cut-off state from the stand-alone operating mode.

20. The vehicle electrical system of claim 19 wherein the transformation of a select control module from the stand-alone operating mode into the cut-off state is implemented based on a majority decision of at least one of:
at least one other control module; and
the power supply modules;

wherein the select control module being in the stand-alone operating mode represents a single, faulty control module of an otherwise fault-free, functionally associated group of control modules.

21. The smart power supply control module of claim 15 wherein the power supply module is configured to be capable of detecting an interrupted or faulty data exchange with at least one select connected control module and, upon detecting an interrupted or faulty data exchange, disconnecting the select control module from the source of electrical energy.

22. The control module of claim 15 wherein the control module is configured so that in the event of an interrupted or faulty data exchange, the control module will transform itself into the stand-alone operating mode.

23. A vehicle electrical system, comprising:
at least two power supply modules; and
at least two control modules;
wherein the at least two power supply modules are connected to each of the at least two control modules for the purpose of supplying electrical energy;
wherein the at least two control modules are interconnected for the purpose of data exchange;
wherein the at least two power supply modules are configured as smart devices and are connected to at least one of the at least two control modules for the purpose of data exchange; and
wherein the at least two power supply modules are configured to accomplish at least one of:
 in the event of an internal malfunction of a select control module, the power supply modules will place the select control module into a cut-off state by disconnecting the select control module from the electrical energy provided by the power supply, and
 in the event of an interrupted or faulty data exchange with a select control module, the power supply modules will transform the select control module to a stand-alone operating mode;
wherein the power supply modules and the control modules are configured so that disconnecting the select control module from the electrical energy supply occurs only if at least two of the power supply modules independently disconnect the select control module from the electrical energy supply;
wherein the detection of an interrupted or faulty data exchange with the select control module is provided by at least one of:
 at least one other control module, and
 at least one of the power supply modules;
wherein at least one control module is configured so that in the event of an interrupted or faulty data exchange with the select control module, at least one other control module transforms the select control module into the stand-alone operating mode; and
wherein each control module is configured so that in the event of an interrupted or faulty data exchange, each control module transforms itself to the stand-alone operating mode.

24. The vehicle electrical system of claim 23 wherein each control module is configured so that they may be transformed into the cut-off state from the stand-alone operating mode.

25. The vehicle electrical system of claim 24 wherein the transformation of the select control module from the stand-alone operating mode into the cut off state is implemented based on a majority decision of at least one of:
at least one other control module; and
the power supply modules;
wherein the select control module being in the stand-alone operating mode represents a single, faulty control module of an otherwise fault-free, functionally associated group of control modules.

* * * * *